United States Patent

Schumacher

[15] 3,655,245
[45] Apr. 11, 1972

[54] SILO UNLOADER DISCHARGE TUBES
[72] Inventor: Harold W. Schumacher, Route 2, De Soto, Wis. 54624
[22] Filed: Aug. 27, 1970
[21] Appl. No.: 67,401

[52] U.S. Cl. ..................302/59, 193/25 R, 214/17 DB, 302/64
[51] Int. Cl. .....................................B65g 53/40
[58] Field of Search.................214/17 A, 17 DB, 17 D; 193/25 R, 25 A, 25 E, 25 AC, 25 S, 25 FT, 25 B, 25 C, 7, 30; 108/24; 302/59, 60, 64

[56] References Cited

UNITED STATES PATENTS

| 3,363,785 | 1/1968 | Kucera | 214/17.84 |
| 2,801,137 | 7/1957 | Clay | 214/17.84 |
| 3,068,982 | 12/1962 | Schoolcraft | 193/30 |
| 3,407,007 | 10/1968 | Fassauer | 214/178.84 X |

*Primary Examiner*—Gerald M. Forlenza
*Assistant Examiner*—Jerold M. Forsberg
*Attorney*—Joseph G. Werner, Theodore J. Long, John M. Winter and James A. Kemmeter

[57] ABSTRACT

An elongate flexible plastic tube suspended from the end of the discharge chute of a silo unloader. The tube fits over the end of the discharge chute and is attached thereto by a collar or band so as to hang free in the vertical silo chute.

1 Claim, 1 Drawing Figure

INVENTOR:
HAROLD W. SCHUMACHER

ATTORNEYS

SILO UNLOADER DISCHARGE TUBES

BACKGROUND OF THE INVENTION

This invention relates to new and useful improvements in apparatus for unloading silos and more particularly to discharge tubes for silo unloaders of the type having a silage blower for impelling silage through a discharge chute which is directed outwardly through an access opening in the wall of the silo into a vertical silo chute.

As is well known, a silo unloader commonly comprises mechanism which rotates about the vertical axis of the silo, gathering material from the surface of the silage and conveying it to a substantially centrally located blower that impels the silage through a discharge chute and out an access opening in the wall of the silo into a vertical silo chute located along the outside of the silo wall. These silo unloaders are usually suspended from the top of the silo or supported directly on the surface of the silage.

The present practice is to merely discharge the silage from the discharge chute of the silo unloader into the vertical silo chute through which it drops by gravity. Since the silage contains plant juices in the form of silage pitch or gum, the present practice typically results in a build-up of silage on the wall of the silo chute and on the doors of the access openings in the wall of the silo thereby impeding the discharge of silage through the silo chute and hampering the opening and closing of the access doors in the silo wall.

SUMMARY OF THE INVENTION

Basically my invention comprises a flexible plastic tube, or what may also be called a silo chute liner, that is attached to and suspended from the end of the discharge chute of a silo unloader. The plastic discharge tube hangs freely in the vertical silo chute in spaced relation from the wall thereof. The silage is blown into the discharge chute of the silo unloader and then drops down the plastic discharge tube to the bottom of the silo chute.

The combination of the fluttering action imparted by the blower to the free hanging plastic tube and the smoothness of the inner surface of the tube prevents silage from accumulating in the tube. The flexible plastic tube thus provides unrestricted discharge of the silage and keeps the inner wall of the silo chute clean. Further, the plastic tube keeps the access doors in the wall of the silo free of silage so that they can be readily opened and closed as desired.

Other objects, features and advantages of my invention will be apparent from the following detailed description taken in conjunction with the accompanying drawings wherein a preferred embodiment showing the principles of the invention has been selected for exemplification.

DESCRIPTION OF A PREFERRED EMBODIMENT

Figure 1:
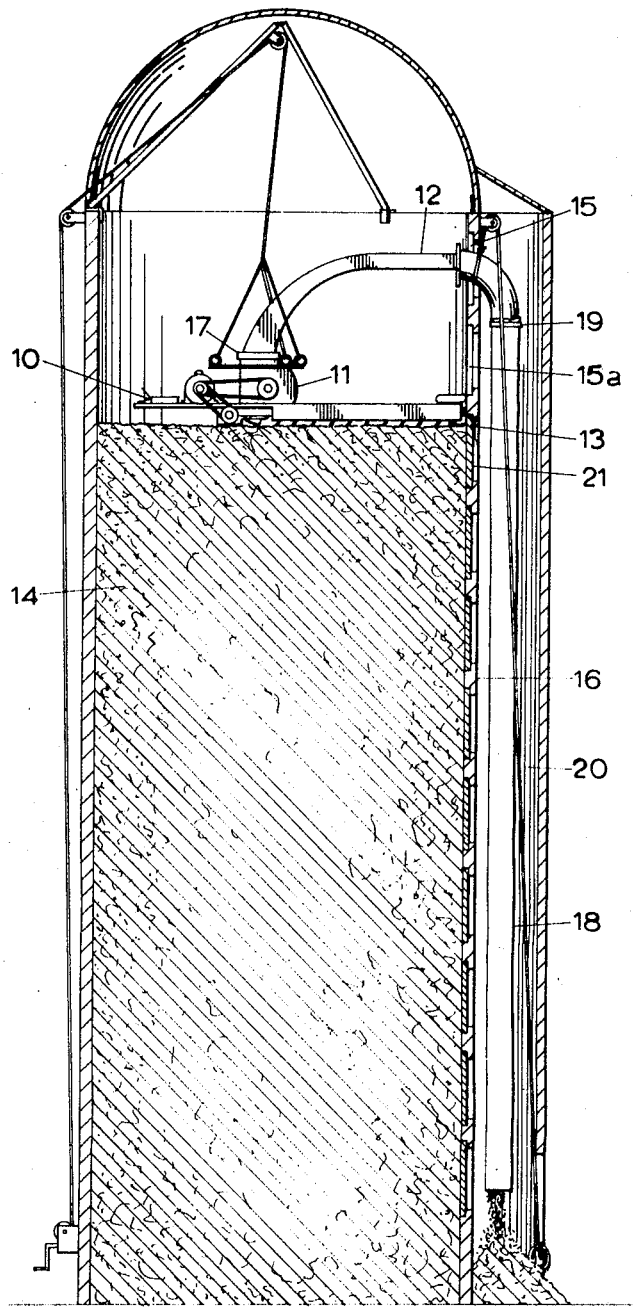
FIG. 1 is a vertical cross section view of a silo with a conventional silo unloader and a plastic discharge tube positioned therein.

Referring now more particularly to FIG. 1, the drawing shows a silo unloader generally at 10 having a blower unit 11 for impelling silage into a discharge chute 12. The silo unloader has an auger 13 on the surface of the silage 14 for drawing silage into the blower housing.

The silo unloader operates in a conventional manner as follows: The auger 13 gathers material from the surface of the silage and deposits it at the inlet of the blower. The blower propels the silage through the discharge chute 12 which extends through an access opening 15 in the wall 16 of the silo. Means are provided for rotating the blower and auger as a unit in a substantially horizontal plane about a vertical axis so that the auger may swing 360° over the entire surface of the silage. The silage discharge chute 12 is mounted in a bushing 17 on the blower housing and does not rotate but remains directed through the access opening in the wall of the silo.

It should be understood that the silo unloader and the operation thereof just described is conventional and merely exemplary of the environment to which my invention pertains. The unloader can be of the type shown, that is, suspended from a cable, or of a type supported directly on the surface of the silage. My improvement is not limited to use with silo unloaders of the type shown in the drawing for exemplification.

My invention comprises an elongate flexible plastic tube 18 suspended from the end of the discharge chute 12 of the silo unloader by a metal collar such as shown at 19, a rubber band, or the like. As shown in the drawing, the discharge tube hangs freely in the vertical silo chute 20 in spaced relation from the wall thereof.

During operation the blower imparts a fluttering action to the free hanging plastic tube which helps to prevent a build-up of silage in the smooth walled tube.

As silage is removed from the silo, successively lower access doors such as 21 are opened above the surface of the silage and the discharge chute 12 of the silo unloader is positioned through the next opening above the silage such as 15a. As the silo unloader is moved downwardly, the bottom end of the free hanging discharge tube 18 may be cut off so that the end thereof remains above the silage deposited at the floor of the barn.

It is understood that my invention is not confined to the particular construction and arrangement of parts herein illustrated and described, but embraces all such modified forms thereof as may come within the scope of the following claim.

I claim:

1. An improvement in silo unloaders having a blower for impelling silage into the door of a vertically disposed silo chute at the side of a silo, aid improvement comprising:

a. a discharge chute extending through the door of the silo chute, said discharge chute having an upper end with a substantially horizontally extending inlet passageway and a lower end having a substantially vertically extending outlet passageway in open communication with said inlet passageway, b. an elongage flexible plastic discharge tube for attachment to the lower end of the discharge chute within the silo chute and encircling said outlet passageway, the material of said plastic discharge tube being of a nature to permit fluttering of the tube in response to the operation of said blower, and c. means for securing said tube to the lower end of said discharge chute for suspending said tube within the silo chute, said tube extending substantially to the bottom opening of the silo chute.

\* \* \* \* \*